Nov. 8, 1932.    T. SCHULL    1,886,981
HITCH DRILL
Filed Sept. 1, 1931    3 Sheets-Sheet 2

Inventor
Thomas Schull
By Bacon and Thomas
Attorneys

Nov. 8, 1932.   T. SCHULL   1,886,981
HITCH DRILL
Filed Sept. 1, 1931   3 Sheets-Sheet 3

Inventor
Thomas Schull

By Bacon & Thomas

Attorneys

Patented Nov. 8, 1932

1,886,981

UNITED STATES PATENT OFFICE

THOMAS SCHULL, OF CLINTON, INDIANA, ASSIGNOR TO BEN H. SCHULL, OF CLINTON, INDIANA

HITCH DRILL

Application filed September 1, 1931. Serial No. 560,616.

My invention relates to drills and more particularly to machines for drilling hitch holes, one object of the invention being to provide a machine which will drill a complete hitch hole in a single operation. The method commonly used for forming hitch holes is to drill several small holes usually three in a horizontal line in a tunnel wall and then two above, and shooting permissible powder to complete the operation, all of which requires considerable time, labor and expense. The present invention provides a device effective to drill and ream a finished hitch hole in a comparatively short length of time and with little expense.

Another object of the invention is to provide a hitch hole drilling machine which is self-propelled over the usual mine tracks and takes electric power from the trolley circuit commonly found in mines, both for its propelling power and for its drilling machinery.

Another object of the invention is to provide a machine which will drill hitch holes at any desired elevation between the tunnel floor and roof.

A further object of the invention is to provide a machine which will drill a hitch hole at any desired angle to the track upon which the device is positioned and at a considerable distance therefrom.

Other objects and advantages will appear in the following description of the preferred embodiment of the invention shown on the attached drawings of which:

Figure 1:
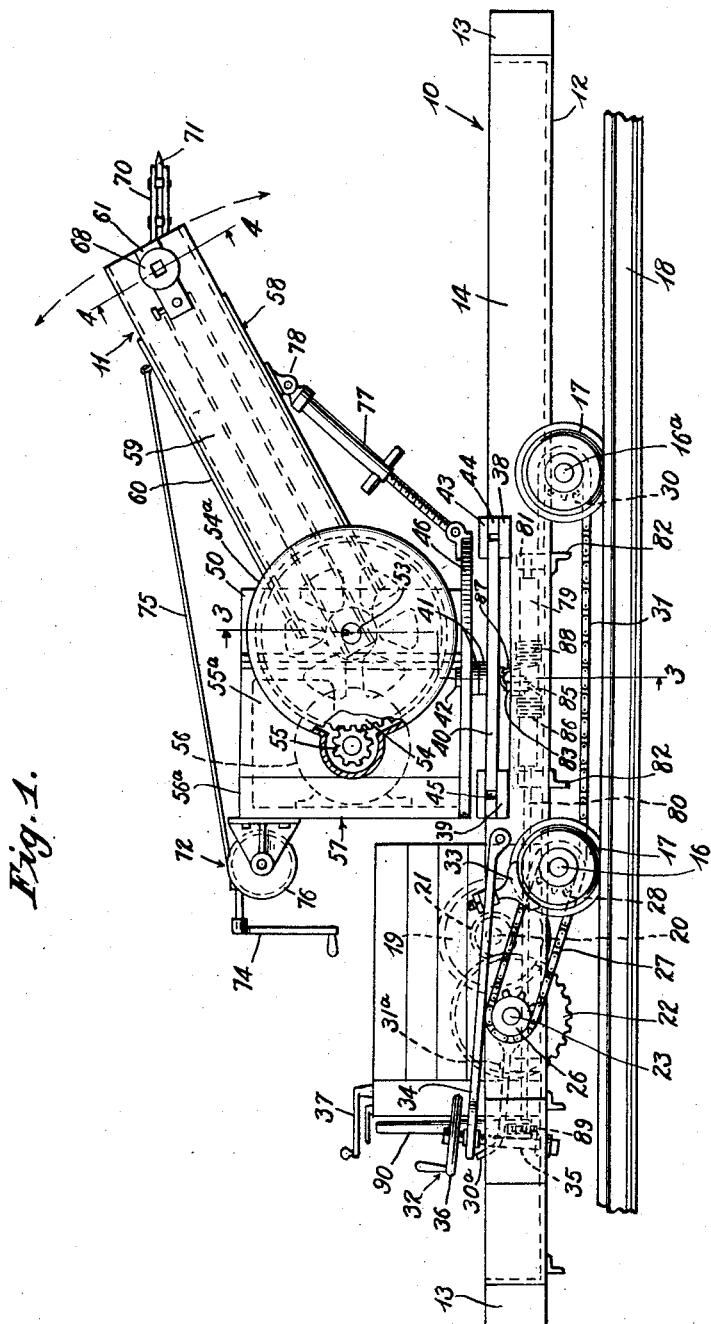
Fig. 1 is a side elevation of the device.

Referring more particularly to the drawings, the numeral 10 designates generally the supporting car upon which the drill is positioned and 11 designates generally the drilling assembly mounted thereon.

The car includes a steel framework 12 provided with wooden bumpers 13 at the ends thereof. The side members 14 of the framework 12 are provided with bearings 15 intermediate their ends for the reception of axles 16 and 16a carrying wheels 17 adapted to run on rails 18 of the usual mine track.

Figure 2:
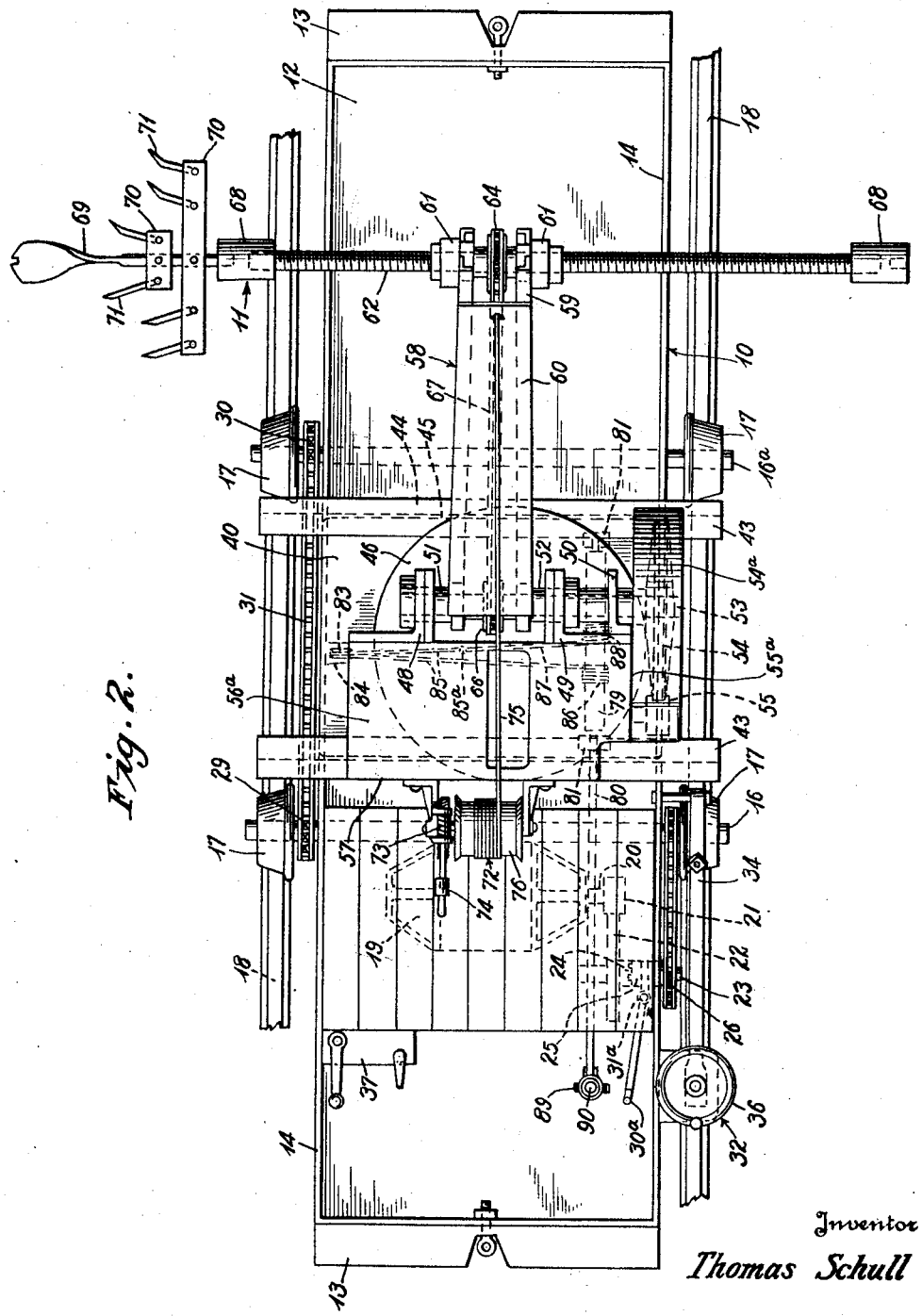
Fig. 2 is a plan view.

A motor 19 shown in Fig. 2 is mounted upon the car adjacent the rear end thereof and has its rotor shaft 20 provided with a pinion 21. The pinion 21 meshes with the gear 22 loosely mounted upon a clutch shaft 23. The gear 22 is provided with clutch teeth 24 adapted to engage teeth on a clutch member 25 slidably but non-rotatably mounted upon the clutch shaft 23. The clutch shaft 23 is also provided with a sprocket 26 which drives the axle 16 by a chain 27 and the sprocket 28 mounted upon one end of the axle 16. On the other end of said axle 16 is mounted another sprocket 29. Another sprocket 30 is correspondingly mounted upon the axle 16a and a chain 31 is positioned upon said sprockets 29 and 30 whereby the motor 19 is effective to drive both axles of the car through the clutch 25. A lever 30a pivoted at 31a is operable to slide the clutch member 25 to engage and disengage the clutch.

A brake 32 comprising a brake shoe 33 frictionally engaging a wheel 17, a lever arm 34, a threaded member 35, and an internally threaded hand wheel 36, is effective to force the brake shoe 33 against the wheel 17 to stop the car and hold it in the desired position. The car is also provided with controller 37 controlling the motor 19.

Suitably secured to the side members 14 of the car and extending transversely of the car are slide members 38 and 39 upon which the drilling apparatus 11 is supported so as to be movable transversely of the car. A plate member 40 rests upon the slide members 38 and 39 and rotatably supports the drilling assembly by means of thrust members 41 and a pivot pin 42. The supporting plate 40 is retained upon the slide members 38 and 39 by guide members 43 and 44 suitably secured to slide members 38 and 39 to form a groove 45 in which supporting member 40 is positioned.

The drilling apparatus rests upon and is secured to a turn-table 46 having an aperture 47 through which pivot pin 42 extends to form an axis about which the turn-table is rotatable. Mounted upon the turn-table are drilling assembly frame members 48, 49 and 50 in which are positioned bearings 51 and 52 for a main drive shaft 53. Upon one end of said drive shaft is secured a gear 54 meshing with a pinion 55 mounted upon the rotor shaft of a motor 56 carried by a rear frame member 57 secured to the turn-table 46. A gear cover 54ª encloses the gear 54 and pinion 55 and covers 55ª and 56ª enclose the motor 56.

Between the frame members 48 and 49 a boom 58 is loosely mounted upon the drive shaft 53 so as to be rotatable in a vertical plane about said drive shaft. The boom 58 is formed of side channel members 59 and top and bottom plates 60 so as to be substantially rectangular in cross section. Bearings 61 are secured to the channel members of the boom at the end remote from the shaft 53. These bearings are internally threaded and are adapted to receive a drill thread bar 62 which extends through apertures in the channel member. The drill thread bar 62 is provided with a longitudinal groove 63 and a sprocket 64 is positioned on the thread bar between the channel members and has a key 65 extending into said groove 63 such that the sprocket is slidable but non-rotatably mounted upon the thread bar. A sprocket 66 is fixedly mounted upon the main drive shaft 53 and a chain 67 connects the sprockets 66 and 64 whereby the thread bar is driven from the drive shaft 53.

The thread bar 62 is provided at each end with a chuck 68 adapted to receive the shank of a pilot bit 69. Mounted upon the shank of the pilot bit are cross members 70 upon which are positioned reamers 71 to enlarge a hole drilled by the pilot bit 69.

Means are provided for raising and lowering the boom 58 comprising a windlass 72 operable by a worm 73 to which is attached a crank 74. A cable 75 mounted upon the drum 76 of the windlass and attached to the boom 58 at 59 is effective to raise the boom. Also a screw jack 77 attached at one end of the boom as at 78 and at the other end to the turn-table 46 is adapted to hold the boom in adjusted position.

Figure 3:
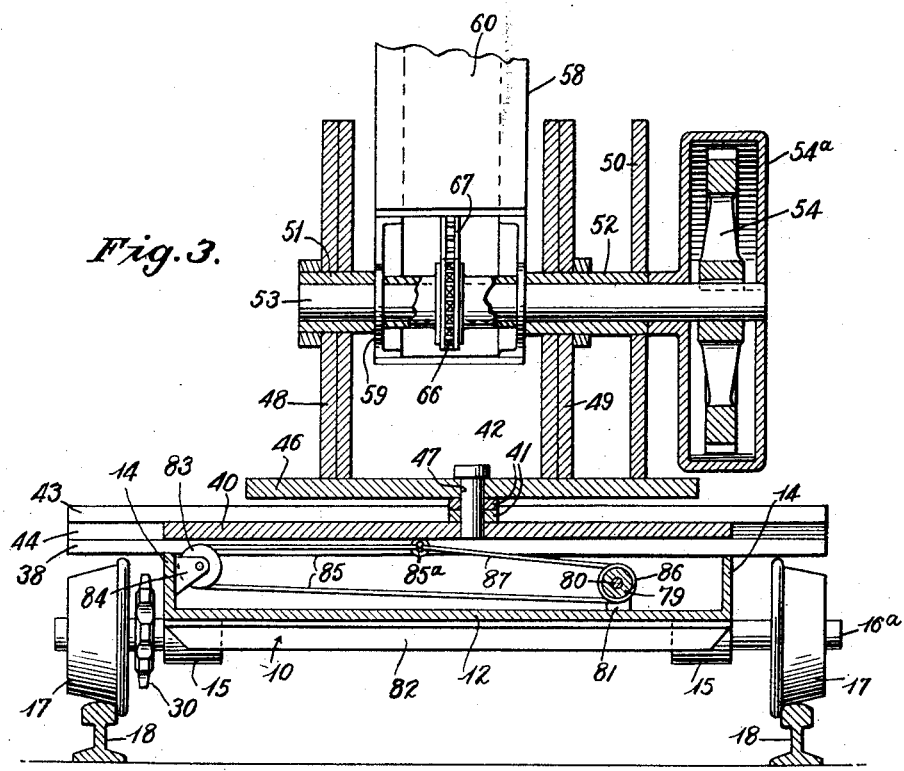
Fig. 3 is a sectional view taken on the line 3—3 of Fig. 1.
Figure 4:
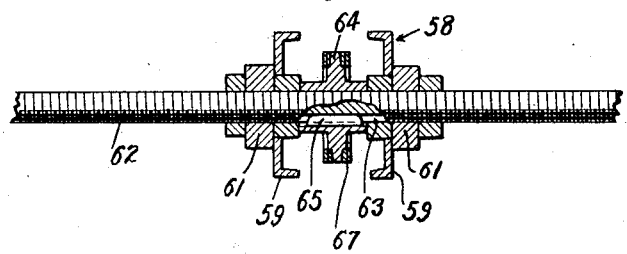
Fig. 4 is a detail, partly in section of the drill or thread bar.

Means are also provided for moving the drilling assembly transversely of the car comprising a drum 79 located adjacent one side of the car below the supporting plate 40. The drum is fixedly mounted upon the shaft 80 extending longitudinally of the car and journaled in bearings 81 mounted upon cross pieces 82 extending transversely of the car below the slide members 38 and 39. A sheave 83 is rotatably mounted at the opposite side of the car in a bracket 84 attached to a side frame member 14. A cable 85 attached at one of its ends to the supporting plate 40 at 85 passes around the sheave 83 and has its other end wound around and attached to the drum 79 at 86 such that rotation of the drum in a counter-clockwise direction (Fig. 3) will cause the drilling assembly to be moved to the left. Another cable 87 is also attached at one end to the plate 40 and 85 and has its other end wound around and attached to the drum as at 88 such that rotation of the drum in the other direction will cause the drilling assembly to move to the left. The shaft 80 upon which the drum 79 is mounted extends longitudinally of the car to a point adjacent the controller 37 and brake wheel 36. The rear end of the shaft is provided with a ratchet 89 and a pawl lever 90 provided with a double pawl is operable to turn the shaft 80 in either direction to slide the drilling assembly transversely of the car.

It will be noted that the complete hitch drill is movable under its own power to any place in a mine where proper tracks and power are available and may be held stationary at the working position by the brake 32. The boom upon which the drill and carrying thread rod is mounted can be raised or lowered and held in adjusted position so as to enable hitch holes to be drilled at any desired height. The entire drilling assembly can be moved transversely of the car and held in adjusted position by the ratchet device 89 and 90, so as to position the drill as near to the tunnel sides as desired or to enable a drilling operation upon a wall at a considerable distance from the track. Also the drilling assembly may be swung about the pivot 42 as an axis to enable a horizontal hole to be drilled at any desired angle to the track. If desired suitable clamping means (not shown) may be provided to prevent further rotation of the drilling assembly.

It will also be noted that the pilot bit 69 and reamers 71 are mounted upon a thread bar 62 such that rotation of the thread bar in the proper direction automatically feeds the drill and reamers against the work. Reversal of the motor 56 and the consequent reversal of the direction of rotation of the thread bar serves to withdraw the drill. Also by mounting the bit and reamers upon the opposite end of the thread bar the drill may be automatically fed to drill a hole upon the opposite side of the car.

It is to be understood that my invention is not limited to the precise construction and arrangement of parts shown and described, but the details thereof may be varied within

What I claim is:

1. In a machine for drilling hitch holes, a drilling assembly comprising a frame rotatably mounted upon a base so as to be rotatable in a horizontal plane, a motor secured to said frame, a boom having an end supported by said frame and having a rotatable drill shaft journaled in its end remote from said frame, said boom extending outwardly from said frame and being pivotally connected to said frame for pivotal movement in a vertical plane, means to raise and lower said boom, said drill shaft being positioned transversely of said boom and power transmitting means between said motor and said drill shaft for rotating the latter.

2. A machine for drilling hitch holes comprising a frame having a motor mounted thereon, a horizontally disposed shaft carried by said frame and rotatable in bearings carried by said frame, a boom having an end journaled upon said shaft for pivotal movement about said shaft, said boom extending outwardly from said frame, a rotatable drill-carrying member journaled in said boom at the end remote from said shaft and power transmitting means including said shaft between said motor and said member for rotating said member, a support for said frame including a member mounted upon a car so as to be slidable transversely thereof, means to move said member transversely of said car, said frame being pivotally mounted upon said support.

3. In a machine for drilling hitch holes, a car having horizontally disposed guides extending transversely thereof, a drilling assembly supporting member mounted in said guides, means to move said member along said guides, a drilling assembly frame, means for rotatably mounting said frame upon said supporting member, a motor secured to said frame, a horizontal shaft journaled in said frame, a boom extending outwardly from said drilling assembly frame and perpendicularly to said shaft and having an end journaled upon said shaft, means for raising and lowering said boom, a horizontally disposed drill bar rotatably journaled in said boom remote from said frame, and power transmitting means between said motor and said drill bar for rotating said drill bar.

4. In a drilling machine, a car having transverse guides positioned thereon, a supporting member mounted in said guides for movement transversely of said car, means to move said supporting member, a drilling assembly rotatably mounted upon said supporting member for rotation in a horizontal plane, said drilling assembly comprising a frame, a horizontal shaft journaled in said frame, a motor secured to said frame and having its shaft extending parallel to said horizontal shaft, gearing between said motor and said horizontal shaft, a boom journaled upon said horizontal shaft for vertical movement, means to raise and lower said boom, said boom comprising top and bottom plates and side plates secured to said top and bottom plates, a horizontal drill shaft journaled in said side plates at the end of the boom remote from said frame and power transmission means between said horizontal shaft and said drill shaft.

In testimony whereof I affix my signature.

THOMAS SCHULL.